United States Patent [19]

Bitetti

[11] Patent Number: 4,726,002
[45] Date of Patent: Feb. 16, 1988

[54] DASHBOARD CLOCK

[76] Inventor: Rodolfo Bitetti, Via Celio, 2, 20148 Milano, Italy

[21] Appl. No.: 945,305

[22] Filed: Dec. 19, 1986

[30] Foreign Application Priority Data

Dec. 20, 1985 [IT] Italy .............................. 54271/85[U]

[51] Int. Cl.$^4$ ............................................. G04B 19/30
[52] U.S. Cl. ........................................ 368/227; 368/67
[58] Field of Search ................................. 368/67, 227

[56] References Cited

U.S. PATENT DOCUMENTS

| 3,722,206 | 3/1973 | Bergey | 368/227 |
| 3,992,874 | 11/1976 | Collins | 368/227 |
| 4,247,928 | 1/1981 | Dorfman | 368/67 |

FOREIGN PATENT DOCUMENTS 550767 10/1975 Japan .

Primary Examiner—Bernard Roskoski

[57] ABSTRACT

A dashboard clock in which a liquid crystal plate for display on a front face, a light source and a controlling electronic circuit are structured in such a way that an opening permits direct illumination and heating of the plate by means of the light source while reducing the length of the connections between the plate and the electronic circuit.

Such a clock is conveniently utilized, for example, on board motor vehicles.

13 Claims, 7 Drawing Figures

DASHBOARD CLOCK

BACKGROUND OF THE INVENTION

The present invention relates to a dashboard clock comprising a liquid crystal plate for providing a display on its front face, a light source for illuminating the rear face of the plate and an electronic control circuit for the plate and the light source.

By way of example, such a clock is utilized on board motor vehicles.

Clocks of this type are already known in which the electronic control circuit is disposed behind and parallel to the plate. In order to make the electrical connections between the circuit and the plate of a reasonable length, the light source, generally a relatively bulky lamp, is placed outside the assembly constituted by the plate and the circuit. A light guide (formed of a transparent material having a refractive index higher than air), one end of which is placed in front of the light source and the other end of which is placed between the circuit and the plate, channels a part of the light from the source towards the rear part of the liquid crystal plate.

However, since only part of the light from the light source is channeled by the light guide, and since this guide has losses, the liquid crystal plate can appear insufficiently lit under certain illumination conditions of the dashboard.

Moreover, if the clock must be utilized in a very cold environment it can be necessary to provide heating means for the liquid crystal plate, which does not function satisfactorily at a temperature lower than a certain limit.

SUMMARY OF THE INVENTION

The present invention seeks to provide a remedy to these disadvantages. It has for its subject, for this purpose, a clock of the type just defined, characterized by the fact that the electronic circuit and the plate are structured to present an opening which permits direct illumination of the plate by the light source.

Thus the whole of the light emitted by the light source is utilized to illuminate the liquid crystal plate which is thus adequately lit under all illumination conditions of the dashboard.

Advantageously the light source is an incandescent lamp.

In this case the heat liberated by the lamp is sufficient for heating the plate and the previously necessary heating means can be eliminated.

Again, advantageously, the electronic circuit and the plate are structured to be in significant mechanical contact, at least in the vicinity of the connection zone which serves for electrical connection thereof.

Now the length of the connections between the electronic circuit and the plate is reduced to the minimum, which minimises the risks associated with electro-magnetic disturbances and improves reliability.

Again, advantageously, the electronic circuit is at least in part composed of components disposed perpendicularly to the plate.

Since the contact zone for connections of the liquid crystal plate is usually situated along one of its major sides, the opening which permits direct illumination can correspond to the whole of the rear part of the plate so as to permit a uniform illumination of the plate to be obtained easily.

In one preferred embodiment the electronic circuit and the plate are electrically connected by means of an elastomeric connector of the type having alternating insulating and conductive layers.

In another preferred embodiment the electronic circuit is made on a flexible support and is directly electrically connected to the liquid crystal plate.

BRIEF DESCRIPTION OF THE DRAWINGS

The present invention wil be better understood with the aid of the following description of two embodiments of the clock of the invention, in which reference is made to the attached drawings, in which.

DETAILED DESCRIPTION OF THE INVENTION

Figure 1:
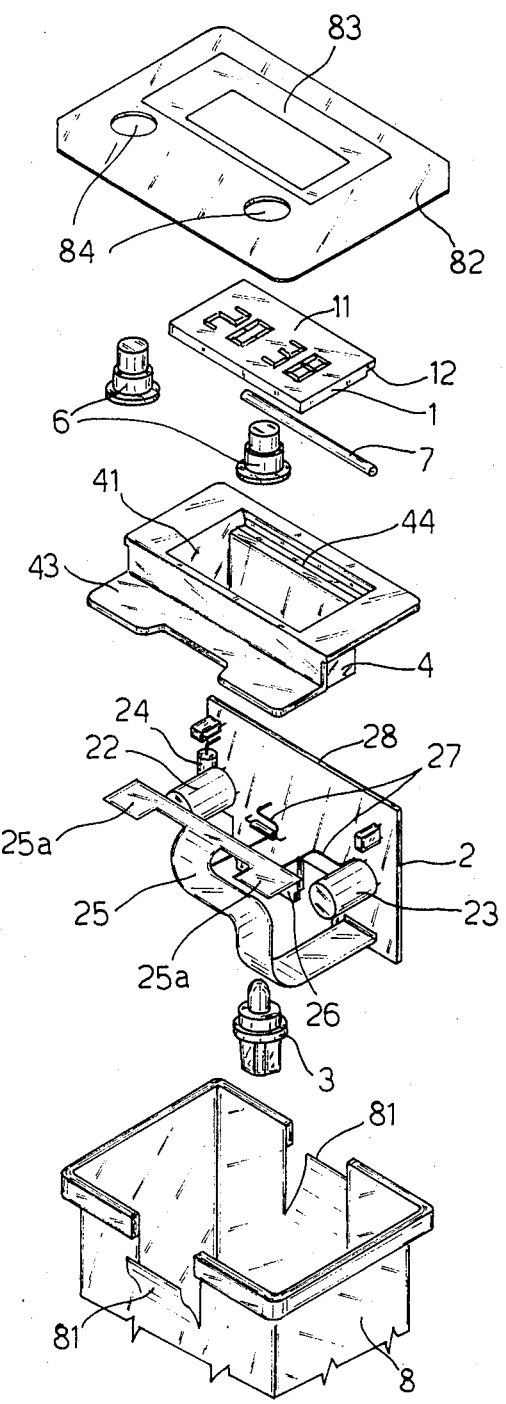
FIG. 1 is an exploded perspective view of a dashboard clock.
Figure 2:
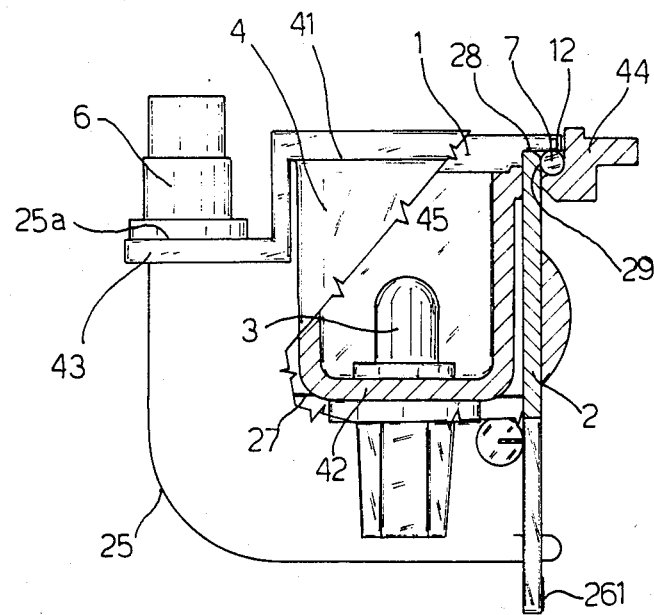
FIG. 2 is a side view, in partial section, of the clock of FIG. 1.
Figure 3:
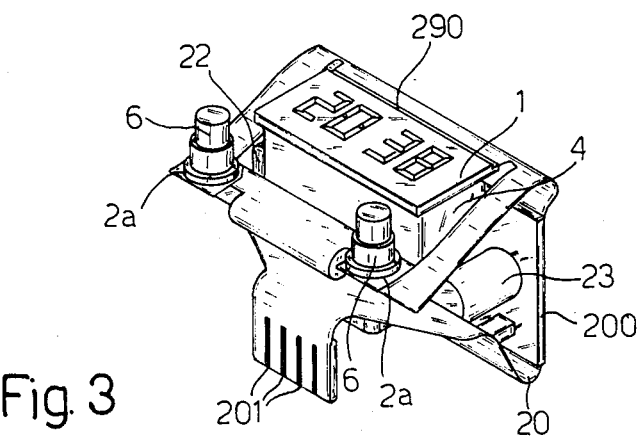
FIG. 3 is a perspective view of another dashboard clock.
Figure 4:
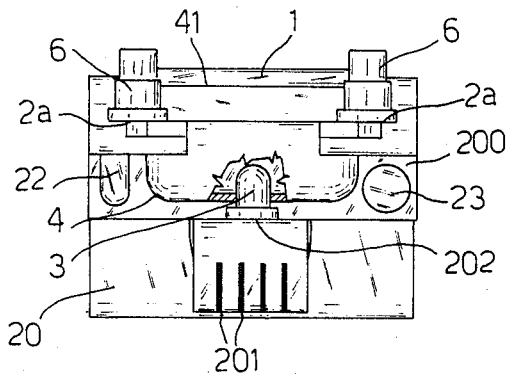
FIGS. 4, 5 and 6 respectively represent a plan view, a side view and a front view of the clock of FIG. 3.

Making reference to FIGS. 1 and 2, a dashboard clock for a motor vehicle comprises principally a liquid crystal plate 1, a light source, in particular an incandescent lamp 3, for illuminating the plate 1 from the rear, and an electronic circuit 2 for control of the plate 1 and the lamp 3.

The liquid crystal plate is the conventional type which permits display of the time on its front face 11, and includes a connection zone 12 situated on its rear face along one of its major sides.

The electronic circuit 2 is a rigid printed circuit which comprises, in a known way, a specialized integrated circuit 21 and the other components necessary for its operation, among other things a quartz oscillator 22, a capacitor 23 and a resistor 24. The terminals for setting the time, with which the integrated circuit 21 is provided, are connected to conductive tracks of a flexible circuit 25, conveniently made of Mylar, the ends of which tracks are situated side by side in the time-setting contact zone 25a.

A part 26 of the electronic circuit 2 is structured to be fitted to a connector and provides input contacts 261. The electronic circuit 2 also includes two pins 27 for supply of the lamp 3 and output contacts formed in a connection zone 29 which extends along its longitudinal upper edge 28.

The clock also includes a light chamber 4 the bottom 42 of which is shaped mechanically to support the lamp 3. The light chamber 4 is closed on four sides and has in its upper part an opening 41, the dimensions of which are the same as those of the plate 1.

Two pushbuttons 6, of a known type which are deformable under pressure, are disposed above the time-setting zone 25a of the flexible circuit 25, the latter being, in the vicinity of the zone 25a, in contact with a support plate 43 formed outside the light chamber 4. A generally cylindrical, elastomeric connector 7, of known type having alternating insulating and conductive layers disposed perpendicular to its axis, and of length equal to that of the connection zones 12 and 29, is maintained in a V-shape groove 44 situated outside the light chamber 4. The groove 44 has a first flank disposed horizontally in FIGS. 1 and 2, in such a way that the connection zone 12 of the plate 1 comes into contact with the parts of the elastomeric connector 7 opposite this first flank.

The electronic circuit 2 is disposed perpendicular to the plate 1 in such a way that its longitudinal edge 28 is located substantially in contact with the plate 1, with its connection zone 29 in contact with the part of the elastomeric connector 7 opposite the second flank of the groove 44 disposed vertically in FIGS. 1 and 2. It is maintained in this position by a flange 45 with which the side wall of the light chamber 4 is provided opposite the groove 44.

The assembly of the preceding elements is disposed in a classical manner in a protection container 8 provided with fixing tongues 81 for fixing to the dashboard, and a cover 82 provided with a window 83 which allows the front face 11 of the plate 1 to be seen, and with holes 84 for the time-setting pushbuttons 6.

The clock described above operates in the following manner.

The electronic circuit 2 is connected by means of two of the input contacts 261 to the battery of the vehicle, which provides the electrical energy necessary for its operation. On the other input contacts 261 are applied signals representative of the ignition of the vehicle, its movement and its illumination.

In a known way, the electronic circuit 2 permanently controls the display plate 1 and, in response to the input signals, the supply to the lamp 3, in such a way that it is illuminated when the vehicle ignition is switched on, more or less intensely independance on whether it is day or night, that is, depending on whether or not the lights are extinguished or illuminated.

In a manner which is also known, the time setting is effected by pressing one or the other of the pushbuttons 6 into contact with the support plate 43, which has the effect of applying a conductive disc onto the time-setting zone 25a corresponding to the flexible circuit 25, and of electrically connecting the ends of the two tracks connected to the integrated circuit 21, which then detects the short circuiting of two of its time-setting terminals and responds accordingly. Since, because of the particular arrangement of the electronic circuit 2 perpendicular to the liquid crystal plate 1, an opening 41 of identical dimensions to those of the plate 1 is situated in the rear part of the latter, for its direct illumination by the lamp 3, the illumination of the plate is sufficient even when the passenger compartment of the vehicle is very brightly lit, for example by the sun.

Moreover, the heat emanating from the incandescent lamp 3, which is enclosed in the light chamber 4, is sufficient to bring the plate 1, which closes the opening 41, to a temperature compatible with good operation of the liquid crystal which it contains, even if the ambient temperature is very low.

Moreover, because the plate 1 and the electronic circuit 2 are very close to one another, in the vicinity of the connection zones 12 and 29 the length of the electrical connections, formed in the example by the cylindrical elastomeric conductor 7, is reduced.

FIGS. 3-7 present another embodiment of the clock according to the present invention, in which the constituent elements similar to those of the embodiment of FIGS. 1 and 2 carry the same reference numerals. For evident reasons of simplicity, the protection container, its cover, as well as various elements such as the support plate for the time-setting keys are not shown in FIGS. 3-7.

Referring now to FIGS. 3-7, the electronic circuit is a flexible printed circuit 20, conveniently made of Mylar, on which are formed, as in the preceding case, time-setting zones 2a for the time-setting pushbuttons 6. The electronic circuit 20, provided with input contacts 201, is directly connected to the lamp 3 which is situated in an orifice 202. The electronic circuit 20 is also directly electrically connected to the liquid crystal plate 1, conveniently by means of soldering of its output contacts in a connection zone 290.

A rigid plate 200 is coupled to the circuit 20 in the zone which provides the specialized integrated circuit type components 21, the quartz oscillator 22, the capacitor 23, etc. The presence of the rigid plate 200 permits an improvement in the temperature resistance of the Mylar sheet on which the circuit 20 is formed, by acting as a radiator upon soldering of the components.

The flexibility of the printed circuit 20 permits the general structure of the clock of FIGS. 1 and 2 to be preserved, the plate 1, the lamp 3 and the time-setting zones 2a being directly electrically connected to the electronic circuit 20. In relation to the embodiment of FIGS. 1 and 2, the second embodiment permits an increase in the reliability of the assembly since it permits the elastomeric connector 7, the pins 27 for supply of the lamp 4 and the connection of the flexible circuit 25 and the rigid circuit 2 to be eliminated.

Figure 5:
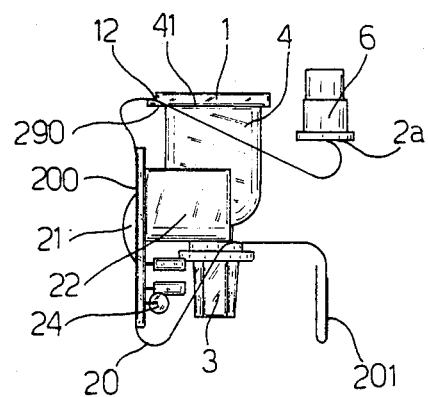
Figure 6:
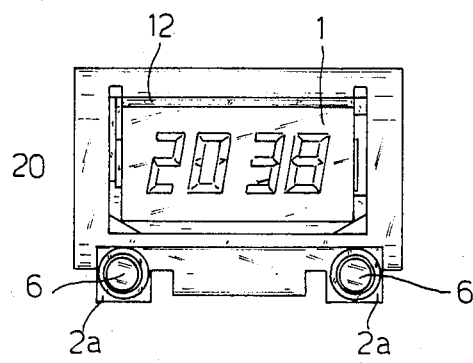
Figure 7:
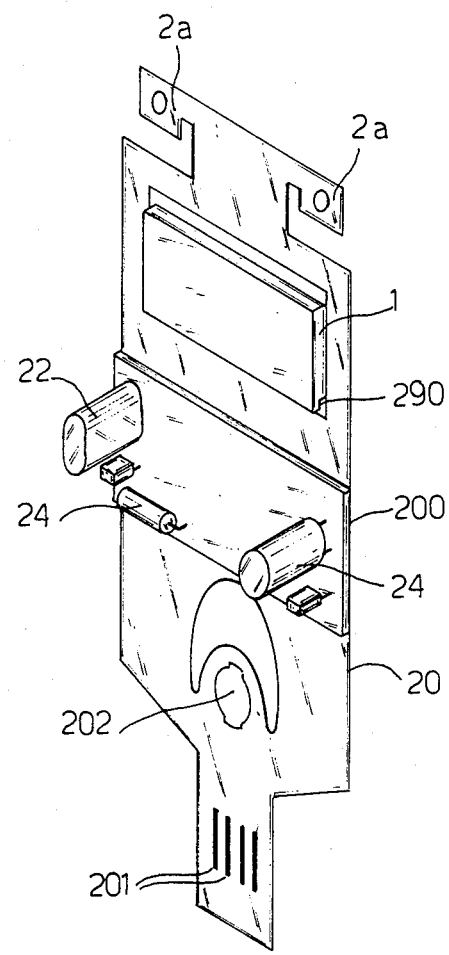
FIG. 7 is a perspective view of a flexible electronic circuit, shown spread out, of the clock of FIG. 3.

Moreover, assembly is simplified and since it can be formed on a continuous strip comprising a sequence of circuits 20 spread out as that of FIG. 5 and cut after assembly of the different elements, it can be automated.

The good electrical operation of the circuit can be tested before folding and assembly in the container.

The liquid crystal plate, connected in the embodiment by soldering, can also be connected to the electronic circuit 20 by gluing with a conductive adhesive.

The flexible support of the electronic circuit 20 in the embodiment made of Mylar, can be replaced with any other convenient type of support and in particular with a support of kapton. In this case the rigid plate 200 can be eliminated, bearing in mind the good temperature behavior of kapton.

Naturally, if the climatic stresses are not severe, use of an incandescent lamp is not strictly necessary and any other known type of light source can be utilized.

Finally, it is clear that the clock described above can have further modifications and variations introduced thereto without departing from the present invention.

What is claimed is:

1. A car clock comprising in combination:
   a case including a front wall provided with a window,
   a plane liquid crystal display cell disposed in said case in parallel to said front wall, said cell having a front face and a rear face, said front face being visible through said window,
   a plane support made of electrical insulating material for supporting a driver circuit, provided on said rear face of said cell and arranged perpendicular to said cell in the vicinity of a longitudinal edge thereof,
   first connecting means comprising a plurality of conductors for connecting said cell and said driver circuit, a light source supported in said case on the side of said rear face of said cell and arranged to directly illuminate said rear face of said cell, second connecting means for connecting said light source and said driver circuit, a control means supported by said front wall and accessible on a front face thereof, and third connecting means for connecting said control means and said driver circuit, whereby actuation of said control means enables setting of the car clock.

2. A car clock according to claim 1, wherein said light source is an incandescent lamp.

3. A car clock according to claim 1, wherein said first connecting means comprises elastomeric conductors.

4. A car clock according to claim 1, wherein said first connecting means comprises a cylindrical element made up of a stack of layers made of elastomeric material, the material of said layers being alternately electrically conducting and electrically insulating, a longitudinal groove having first and second faces provided in said case in the vicinity of said longitudinal edge of said cell, said groove receiving said cylindrical element whereby said cell and said plane support, contact said cylindrical element respectively in first and second zones thereof, said first and second zones respectively opposing said first and second faces of said groove.

5. A car clock according to claim 1, wherein said second connecting means comprises two conducting pins supported by said plane support.

6. A car clock according to claim 1, wherein said third connecting means comprises a flexible film made of an electrically insulating material provided with two separate strips made of an electrically conducting material, and said control means is adapted to short-circuit said strips.

7. A car clock according to claim 1, wherein said first connecting means comprises a flexible film made of an electrically insulating material which supports said driver circuit and is provided with a plurality of strips made of an electrically conducting material so as to directly connect said cell and said driver circuit.

8. A car clock according to claim 7, wherein said second, third and fourth connecting means comprise further strips made of an electrically conducing material provided on said flexible film.

9. A clock according to claim 1, wherein said first, second and third connecting means comprise separate strips made of an electrically conducting material provided on a common flexible film made of an electrically insulating material.

10. A car clock according to claim 9, wherein said plane support comprises said flexible film.

11. A car clock according to claim 10, wherein said cell comprises connections and said connections are soldered to associated strips provided on said flexible film.

12. A car clock according to claim 11, wherein said cell comprises connections and second connections are directly adhered with an electrically conducting glue to associated strips provided on said flexible film.

13. A car clock comprising in combination:

a case including a front wall provided with a window, a plane liquid crystal display cell disposed in said case in parallel to said front wall, said cell having a front face and a rear face, said front face being visible through said window, a plane support made of an electrically insulating material for supporting a driver circuit, provided on said rear face of said cell and arranged perpendicular to said cell in the vicinity of a longitudinal edge thereof, a longitudinal groove having first and second faces provided in said case in the vicinity of said longitudinal edge of said cell, first connecting means comprising a cylindrical element made up of a stack of layers made of elastomeric material, the material of said layers being alternately electrically conducting and electrically insulating, said cylindrical element being arranged in said longitudinal groove so that said cell and said plane support contact said cylindrical element respectively on first and second zones thereof, said first and second zones being opposite to said first and second faces of said groove, respectively, an incandescent light source supported in said case on the side of said rear face of said cell and arranged to directly illuminate said rear face of said cell, second connecting means for connecting said light source and said driver circuit, a control means supported by said front wall and accessible on a front face thereof, third connecting means comprising a flexible film made of an electrically insulating material and provided with two separate strips made of an electrically conducting material, said strips being disposed relative to the control means so that the actuation of said control means short-circuits said strips to set said car clock, and fourth connecting means for connecting said driver circuit to the power source of the car.

* * * * *